United States Patent [19]
Glugla

[11] 4,345,010
[45] Aug. 17, 1982

[54] ELECTROLYTE FOR SECONDARY ELECTROCHEMICAL CELL

[75] Inventor: Paul G. Glugla, Schenectady, N.Y.

[73] Assignee: General Electric Company, Schenectady, N.Y.

[21] Appl. No.: 218,992

[22] Filed: Dec. 22, 1980

[51] Int. Cl.³ .............................................. H01M 10/40
[52] U.S. Cl. .................................................. 429/197
[58] Field of Search ........................ 429/197, 194, 195

[56] References Cited

U.S. PATENT DOCUMENTS

| | | | |
|---|---|---|---|
| 3,947,289 | 3/1976 | Dey et al. | 429/194 |
| 4,071,665 | 1/1978 | Garth | 429/197 |
| 4,284,692 | 8/1981 | Rao et al. | 429/194 |

OTHER PUBLICATIONS

J. Electroanal. Chem., vol. 68 (1976), pp. 1-18, "High Energy Density Lithium Cells, Part I, Electrolytes and Anodes", by Besenhard et al.

Primary Examiner—Donald L. Walton
Attorney, Agent, or Firm—Jane M. Binkowski; James C. Davis, Jr.; Joseph T. Cohen

[57] ABSTRACT

An electrolyte solution consisting essentially of butylated hydroxytoluene in an amount of about 1.5% by weight to less than 4% by weight of a solution of 1,3-dioxolane and a lithium salt is used as an electrolyte in a secondary electrochemical cell wherein the active material of one of the electrodes is lithium metal.

8 Claims, 3 Drawing Figures

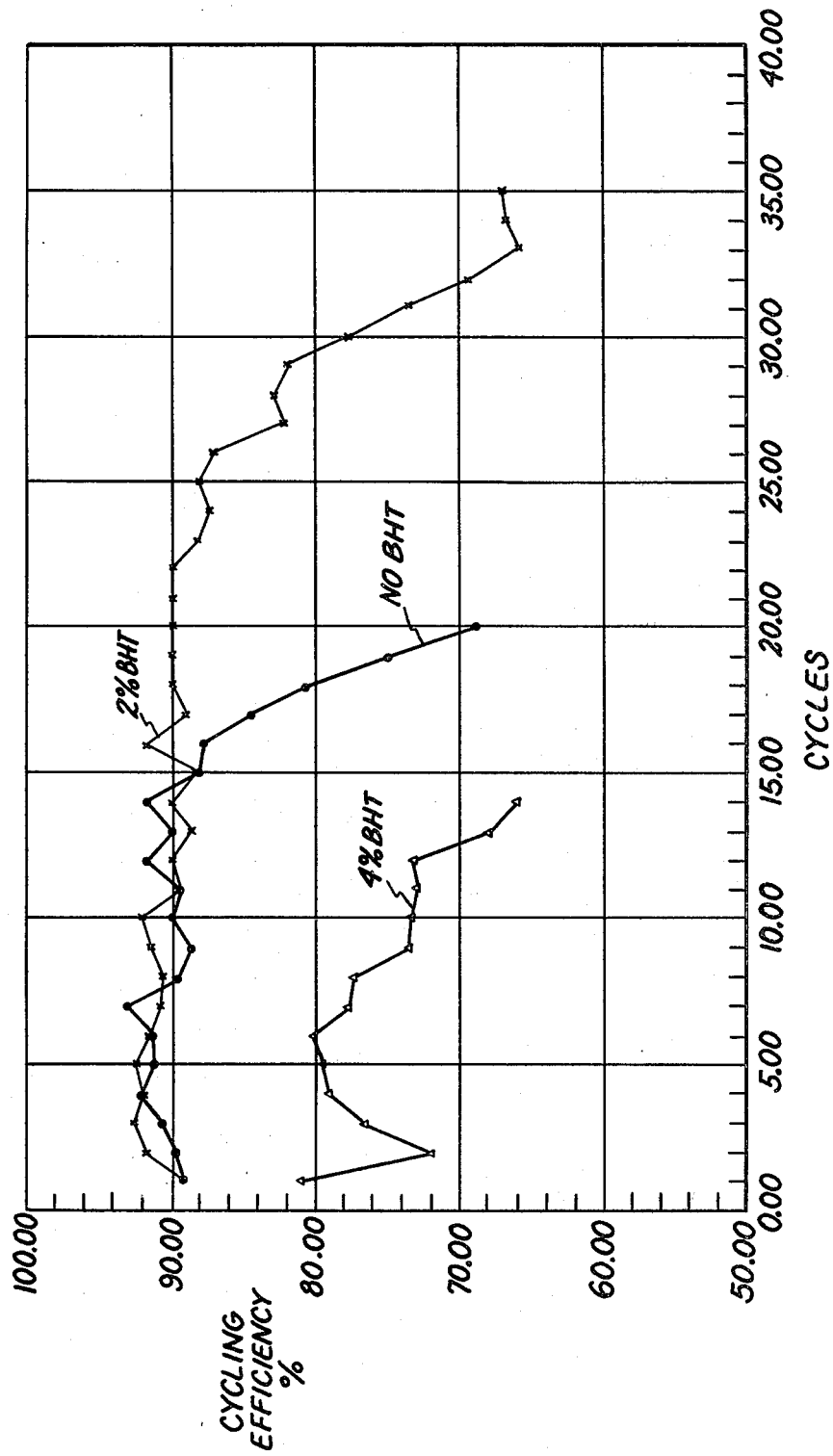

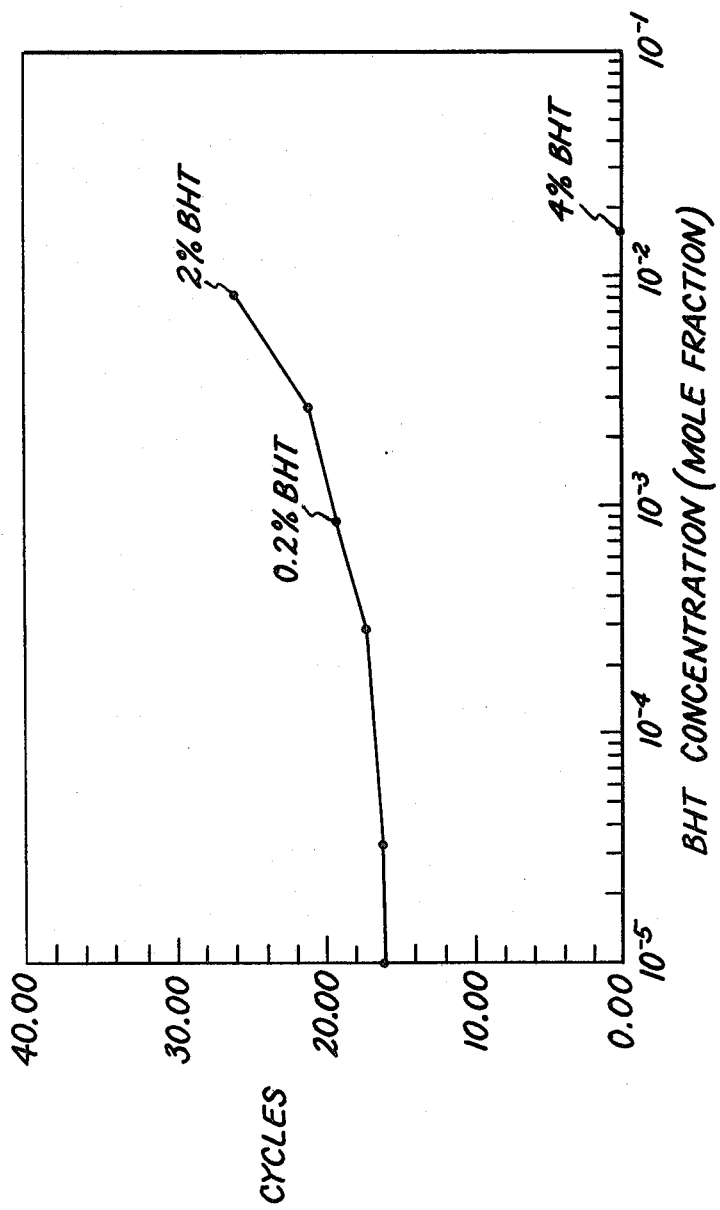

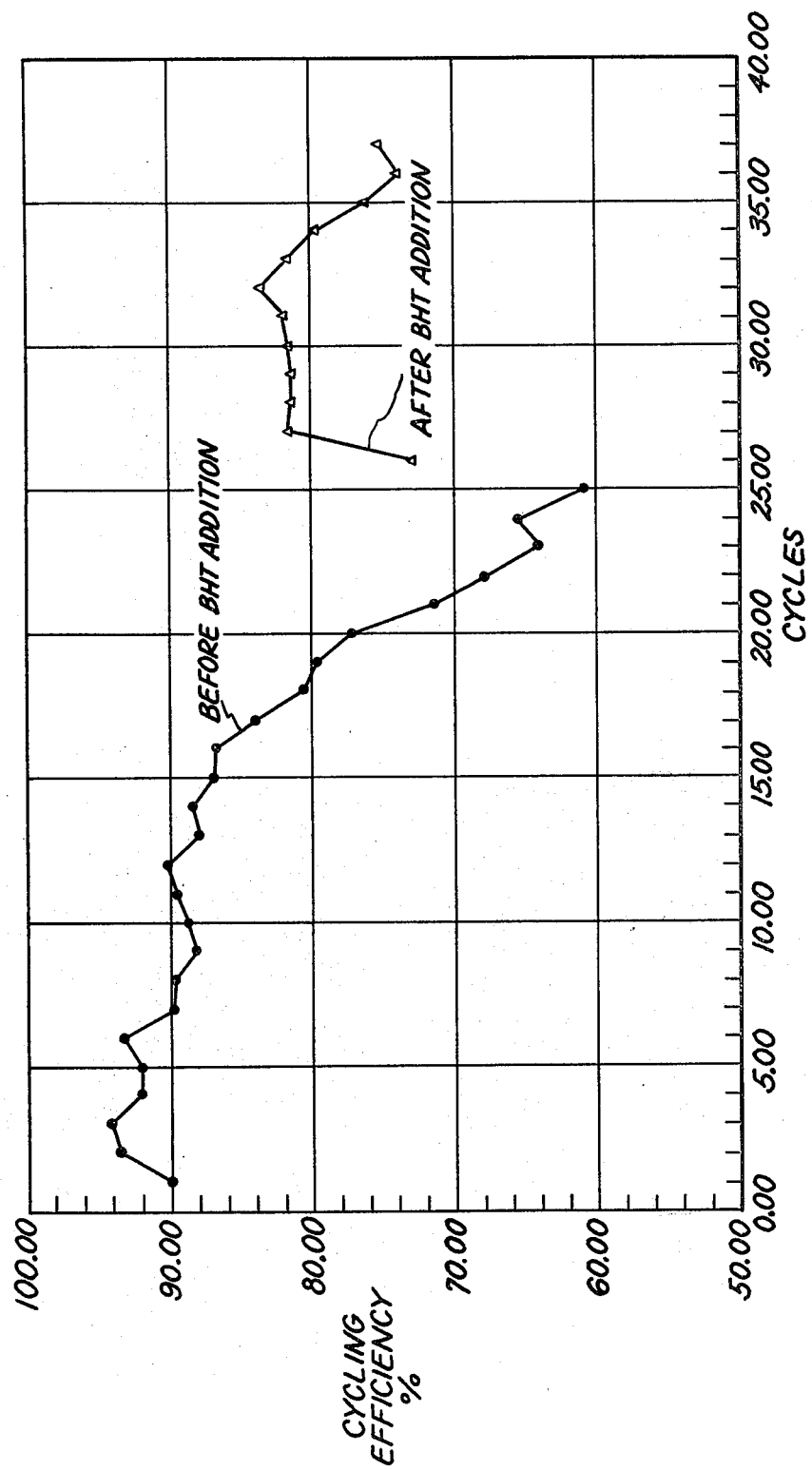

ELECTROLYTE FOR SECONDARY ELECTROCHEMICAL CELL

This invention relates to an improved electrolyte for use with a lithium electrode in a secondary electrochemical cell.

The lithium electrode is the major source of inefficiency in many of the proposed lithium secondary battery systems, i.e. rechargable systems. One of the most successful electrolytes that has been identified for the lithium electrode is comprised of a conductive salt, particularly $LiAsF_6$, dissolved in 1,3-dioxolane. The present invention utilizes butylated hydroxytoluene to produce an improved electrolyte for the lithium electrode to increase its cycle life.

Briefly stated, the present electrolyte solution for use with a secondary lithium electrode is comprised of butylated hydroxytoluene, a 1,3-dioxolane and a lithium salt wherein the butylated hydroxytoluene ranges from about 1.5% by weight to less than 4% by weight of the solution composed of the 1,3-dioxolane and lithium salt.

Those skilled in the art will gain a further and better understanding of the present invention from the detailed description set forth below considered in conjunction with the figures accompanying and forming a part of the specification in which:

FIG. 1 compares the cycling efficiency of the present electrolyte solution containing 2% by weight of butylated hydroxytoluene (BHT) with an electrolyte solution containing no BHT and an electrolyte solution containing 4% by weight BHT;

FIG. 2 shows how the cycle life of the electrolyte solution varies with increasing concentration of BHT; and FIG. 3 illustrates the extent to which cycling efficiency can be renewed by dissolution of BHT in the present amount in the electrolyte.

In the present secondary electrochemical cell, the active material of one of the electrodes is lithium metal. The lithium metal can be used alone, or it can be supported on a suitable substrate such as nickel or aluminum.

Broadly, the counter electrode of the present invention is a depolarizer reducible by lithium metal. It is apparent that in selecting a counter electrode, considerations of corrosiveness, and pressure and temperature requirements must be compatible with the physical properties of the lithium electrode and the present electrolyte solution, i.e. the counter electrode should have no significant deleterious effect on the lithium electrode or the present electrolyte solution. Suitable examples of a useful depolarizer for the present counter electrode include the transition metal sulfides ($TiS_2$, $TaS_2$, $Cr_xV_{1-x}S_2$ where $x=0$ to 1), transition metal oxides ($V_6O_{13}$, $TiO_2$) or the halogens with $\beta$-alumina separators ($\beta$-alumina separator and $Br_2$, $\beta$-alumina separator and $I_2$). Of these counter electrodes the preferred choice is $TiS_2$ since it has been well tested in conjunction with 1,3-dioxolane electrolytes.

The present electrolyte solvent is 1,3-dioxolane or substituted 1,3-dioxolane, which have the formula:

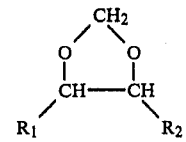

wherein $R_1$ and $R_2$ are the same or different and are hydrogen or alkyl of 1 to 3 carbon atoms. In the present invention, 1,3-dioxolane is preferred, i.e. the compound of formula (1) wherein $R_1$ and $R_2$ are hydrogen.

The lithium salt or lithium salt mixture used in forming the present electrolyte solution is an ionizing solute which will produce an ionically conductive electrolyte solution having a useful specific conductivity at room temperature, i.e., a solution having a specific conductivity at 25° C. of at least about $10^{-5}$ ohm$^{-1}$ cm$^{-1}$. The concentration of the lithium salt in the present electrolyte solution at room temperature ranges from a minimum at which the electrolyte solution has a useful specific conductivity and can be increased up to a point at which it has no significant deleterious effect on the electrolyte solution such as, for example, precipitating out of solution, or polymerizing the 1,3-dioxolane. Specifically, in the present invention, the concentration of the lithium salt in the 1,3-dioxolane can range from about 0.1 Molar to about 1.3 Molar (0.1 mole to 1.3 moles lithium salt per liter of lithium salt-1,3-dioxolane solution), with the particular amount of lithium salt depending largely on the rate of charge desired. Preferably, 0.5 Molar lithium salt in 1,3-dioxolane is used, and preferably the salt is $LiAsF_6$. The lithium salt should be soluble in the 1,3-dioxolane at room temperature and should have no significant deleterious effect on the 1,3-dioxolane, butylated hydroxytoluene or the electrodes.

Representative of the lithium salts useful in the present invention are lithium perchlorate ($LiClO_4$), lithium bromide (LiBr), lithium iodide (LiI), lithium aluminum tetrachloride ($LiAlCl_4$), lithium tetrafluoroborate ($LiBF_4$), lithium hexafluoroarsenate ($LiAsF_6$), lithium hexafluorophosphate ($LiPF_6$), lithium tetramethyl borate ($LiB(CH_3)_4$), lithium methyl sulfonate ($LiOSO_2CH_3$), and lithium oxide aluminum chloride complex salt ($Li_2O.2AlCl_3$).

Butylated hydroxytoluene (BHT), i.e. 2,6-di-tertiary-butyl hydroxytoluene or 2,6-di-tertiary-butyl-para-cresol ($C_{15}H_{24}O$), has the following formula:

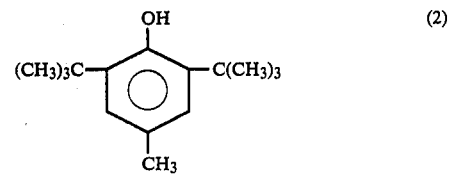

The butylated hydroxytoluene is used in an amount ranging from about 1.5 parts to less than 4 parts by weight per 100 parts of the solution composed of the 1,3-dioxolane and lithium salt, i.e. from about 1.5% by weight to less than 4% by weight of the solution of the 1,3-dioxolane and lithium salt. The specific amount of butylated hydroxytoluene is determinable empirically and depends largely on the component materials of the particular system, particularly on the specific lithium salt or lithium salt mixture used, but an amount of butylated hydroxytoluene of about 2.0% by weight of the lithium salt-1,3-dioxolane solution is preferred since it has shown optimum cycling behavior. Amounts of butylated hydroxytoluene outside the present range of about 1.5% by weight to less than 4% by weight, however, are not effective to increase the cycle life of the lithium electrode significantly.

The invention is further illustrated in the following examples:

EXAMPLE 1

A plate-strip experiment was developed to evaluate the cycling ability of various electrolyte solutions.

The cell system was comprised of a working electrode consisting of nickel on which lithium was to be plated, a counter electrode of lithium metal which provided an infinite source of lithium ions and a reference electrode of lithium metal which was used to measure voltage of the working electrode. All three electrodes were immersed in a common electrolyte.

This plate-strip experiment was chosen as a diagnostic test and was not meant to be the optimum procedure for cycling lithium efficiently. A cycle consisted of a galvanostatic plating of lithium on the nickel working electrode at 1.5 ma/cm$^2$ for 20 minutes followed by a potentiostatic stripping of the nickel electrode to ~70 mV in reference to the lithium reference electrode. 70 mV was chosen as a control voltage because it produces a current of less than 2 mA/cm$^2$ on the nickel electrode in the test cell. The efficiency of a cycle was computed by comparing the coulombs used in the stripping operation to the coulombs used in the plating process. All of the experiments were carried out at room temperature under argon containing less than 10 ppm water and less than 5 ppm oxygen.

In a first experiment, the cycling procedure was applied to a cell wherein the electrolyte solution was composed of 0.5 mole/liter of LiASF$_6$ in 1,3-dioxolane, and 16 cycles above 85% efficiency were attained before failure.

In a second experiment, the cycling procedure was applied to a cell wherein the electrolyte solution was composed of butylated hydroxytoluene in an amount of 2.0 parts per 100 parts of a solution of 0.5 mole/liter of LiAsF$_6$ in 1,3-dioxolane, and 26 cycles were completed above 85% efficiency before failure. This second experiment illustrates the present invention and shows the significantly longer cycle life produced by the present electrolyte solution.

In a third experiment, the cycling procedure was applied to a cell wherein the electrolyte solution was composed of butylated hydroxytoluene in an amount of 4.0 parts per 100 parts of 0.5 mole/liter of LiAsF$_6$ in 1,3-dioxolane, and the cell behaved as a failed cell from the onset.

These experiments are illustrated in FIG. 1.

EXAMPLE 2

In this Example, the procedure used was substantially the same as that set forth in Example 1 except that six experiments were carried out wherein the electrolyte solution was composed of LiAsF$_6$, butylated hydroxytoluene and 1,3-dioxolane. In each experiment, the amount of LiAsF$_6$ was the same, i.e. 0.5 mole of LiAsF$_6$ was used per liter of the electrolyte solution, but the concentration of the butylated hydroxytoluene was varied in each solution as shown in FIG. 2.

FIG. 2 shows that the optimum cycling behavior was attained when the butylated hydroxytoluene was used in an amount of about 2.0% by weight of the 1,3-dioxolane-LiAsF$_6$ solution.

EXAMPLE 3

The procedure in this Example was the same as that set forth for the first experiment in Example 1 where no butylated hydroxytoluene was present in the electrolyte solution composed of dioxolane and LiAsF$_6$.

The cell was cycled as disclosed in Example 1 until failure. At this point, butylated hydroxytoluene in an amount of 2% by weight was dissolved in the LiAsF$_6$-1,3-dioxolane solution and cycling was continued.

The results are shown in FIG. 3. Specifically FIG. 3 shows that the butylated hydroxytoluene renewed some of the cycling efficiency that had previously been seen in the cell.

EXAMPLE 4

In this example, it was determined that butylated hydroxytoluene has an effect on the water content of the electrolyte solution. Gas chromatography was used to determine water content of the following materials after they had been stored under argon containing less than 10 ppm water and less than 5 ppm oxygen for two days at room temperature. The results were as follows:

|  | H$_2$O Content |
|---|---|
| 1,3-dioxolane | <0.01% |
| 0.1 Molar LiBr in methyl acetate | <0.01% |
| 0.1 Molar LiBr in 1,3-dioxolane | 0.09% |
| 0.1 Molar LiBr in 1,3-dioxolane having dissolved therein 2% by weight BHT | 0.04% |

From these tests it appears that butylated hydroxytoluene acts to reduce the water content of the present electrolyte solution.

What is claimed is:

1. In a secondary electrochemical cell wherein the active material of one of the electrodes is lithium metal, the improvement consisting essentially of an electrolyte solution consisting essentially of 2,5-di-tertiary-butyl hydroxytoluene ranging from about 1.5% by weight to less than 4% by weight of a solution consisting essentially of a 1,3-dioxolane or substituted 1,3-dioxolane, which have the formula:

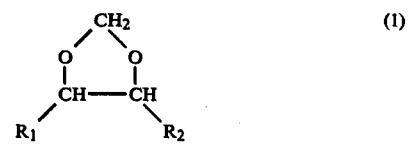

wherein R$_1$ and R$_2$ are the same or different and are hydrogen or alkyl of 1-3 carbon atoms and a lithium salt.

2. The secondary cell according to claim 1 wherein said 2,5-di-tertiary-butyl hydroxytoluene is about 2% by weight of said solution of said 1,3-dioxolane and lithium salt.

3. The secondary cell according to claim 1 wherein the concentration of said lithium salt ranges from about 0.1 mole to about 1.3 mole per liter of said solution of said 1,3-dioxolane and lithium salt.

4. The secondary electrochemical cell according to claim 3 wherein said concentration of said lithium salt is about 0.5 mole per liter of said solution of said 1,3-dioxolane and lithium salt.

5. The secondary electrochemical cell according to claim 1 wherein said lithium salt is selected from the group consisting of lithium iodide, lithium bromide, lithium perchlorate, lithium aluminum tetrachloride, lithium tetrafluoroborate, lithium hexafluoroarsenate, lithium hexafluorophosphate, lithium tetramethyl borate, lithium methyl sulfonate and lithium oxide aluminum chloride complex salt.

6. The secondary electrochemical cell according to claim 1 wherein said lithium salt is lithium hexafluoroarsenate.

7. In a secondary electrochemical cell wherein the active material of one of the electrodes is lithium metal, the improvement consisting essentially of an electrolyte solution consisting essentially of 2,5-ditertiary-butyl hydroxytoluene in an amount of about 2% by weight of a solution consisting essentially of 1,3-dioxolane and lithium hexafluoroarsenate.

8. The secondary electrochemical cell according to claim 7 wherein said lithium hexafluoroarsenate is present in an amount of about 0.5 mole per liter of said solution of 1,3-dioxolane and lithium hexafluoroarsenate.

* * * * *